United States Patent
Campbell et al.

[11] 3,894,202
[45] July 8, 1975

[54] IGNITION DISTRIBUTOR FOR ROTARY INTERNAL COMBUSTION ENGINES

[75] Inventors: Robert E. Campbell, Anderson; Richard D. Watson, Chesterfield, both of Ind.

[73] Assignee: General Motors Corporation, Detroit, Mich.

[22] Filed: Nov. 23, 1973

[21] Appl. No.: 418,675

[52] U.S. Cl. ............ 200/19 R; 200/24; 200/28; 123/146.5 R; 123/148 R
[51] Int. Cl. ........................... H01h 19/10
[58] Field of Search ......... 200/19 R, 19 DC, 19 DR, 200/20, 21, 23, 24, 26, 28, 29; 123/8.09, 8.01, 146.5 R, 148 R, 148 A, 148 DS

[56] References Cited
UNITED STATES PATENTS

| | | | |
|---|---|---|---|
| 2,296,869 | 9/1942 | Peters et al. | 200/20 |
| 3,542,976 | 11/1970 | Moray | 200/24 |
| 3,647,995 | 3/1972 | Wisely | 200/24 |
| 3,766,339 | 10/1973 | Melidosian | 200/24 |
| 3,789,168 | 1/1974 | Meyer, Jr. et al. | 200/19 R |

*Primary Examiner*—James R. Scott
*Attorney, Agent, or Firm*—Richard G. Stahr

[57] ABSTRACT

An ignition distributor for rotary internal combustion engines which simultaneously directs the ignition spark energy produced by respective ignition coils to the leading and trailing spark plugs of the same combustion chamber of the engine. Two electrically conductive members mounted upon a rotatable member, rotated in timed relationship with the engine, are passed in arc-gap relationship with a leading spark plug ignition spark energy input terminal, a trailing spark plug ignition spark plug energy input terminal and each of the leading and trailing spark plug output terminals. The electrically conductive members are so located upon the rotatable member that while either is in arc-gap relationship with one of the ingnition spark energy input terminals the other is in arc-gap relationship with the other one of the ignition spark energy input terminals.

7 Claims, 9 Drawing Figures

IGNITION DISTRIBUTOR FOR ROTARY INTERNAL COMBUSTION ENGINES

The invention is directed to an ignition distributor for rotary internal combustion engines and, more specifically, to an ignition distributor of this type which simultaneously directs the ignition spark energy produced by respective ignition coils to the leading and trailing spark plugs of the same combustion chamber.

The typical rotary internal combustion engine is made up of one or more housing structures, each having axially spaced end walls, and a peripheral wall having an epitrochoidal-shaped inner surface interconnecting the end walls to form a cavity therebetween. Rotatably mounted within each cavity is a rotary piston or rotor member in the form of a curvilinear triangle with three apices. Two spark plugs, generally termed the leading spark plug and the trailing spark plug, are provided for each of the combustion chambers of the engine and are arranged one behind the other in the direction of rotation of the rotary piston or rotor member. That is, the trailing spark plug is behind the leading spark plug in respect to the direction of rotation of the rotary piston or rotor and an apex of the rotary piston passes over the trailing spark plug and the leading spark plug in sequence according to the rotation of the rotary piston. To supply sufficient ignition spark potential to both the leading and trailing spark plugs for satisfactory engine performance, two ignition coils are provided, one for the leading spark plugs and one for the trailing spark plugs. When applied to a rotary engine having more than one cylinder, the leading ignition plug in each of the cylinders is supplied with ignition spark potential from one ignition coil and the trailing spark plug in each of the cylinders is supplied with ignition spark potential from the other ignition coil. Consequently, it has heretofore been necessary to provide separate ignition distributors for each of the ignition coils to supply ignition spark energy to the leading and trailing spark plugs of each of the cylinders. This required a plurality of conventional distributors and the attendant distributor drive mechanisms and internal distributor mechanisms. As the requirement of two ignition distributors is expensive, the provision of a single ignition distributor which will perform the same function formerly requiring two ignition distributors, is desirable.

It is, therefore, an object of this invention to provide an improved ignition distributor for rotary internal combustion engines.

It is another object of this invention to provide an improved ignition distributor for rotary internal combustion engines which simultaneously directs the ignition spark energy produced by respective ignition coils to the leading and trailing spark plugs of the same combustion chamber.

It is an additional object of this invention to provide an improved ignition distributor for rotary internal combustion engines which simultaneously directs the ignition spark energy produced by respective ignition coils to the leading and trailing spark plugs of each combustion chamber of multi-cylinder rotary engines in succession.

In accordance with this invention, an ignition distributor for rotary internal combustion engines is provided wherein the ignition spark energy produced by each of respective ignition coils is simultaneously directed to the leading and trailing spark plugs of the same combustion chamber through two electrically conductive members mounted upon a rotatable member rotated in timed relationship with the engine and passed in arc-gap relationship with each an ignition spark energy input terminal corresponding to the leading spark plugs and the corresponding leading spark plug output terminals and with another ignition spark energy input terminals corresponding to the trailing spark plugs and the corresponding trailing spark plug output terminals and so arranged that when one is in arc-gap relationship with one of the ignition spark energy input terminal, the other is in arc-gap relationship with the other ignition spark energy conductive circuit.

For a better understanding of the present invention, together with additional objects, advantages and features thereof, reference is made to the following description and accompanying drawings in which.

Throughout the several FIGURES of the drawing, like elements have been assigned like characters of reference.

Figures 1, 2:
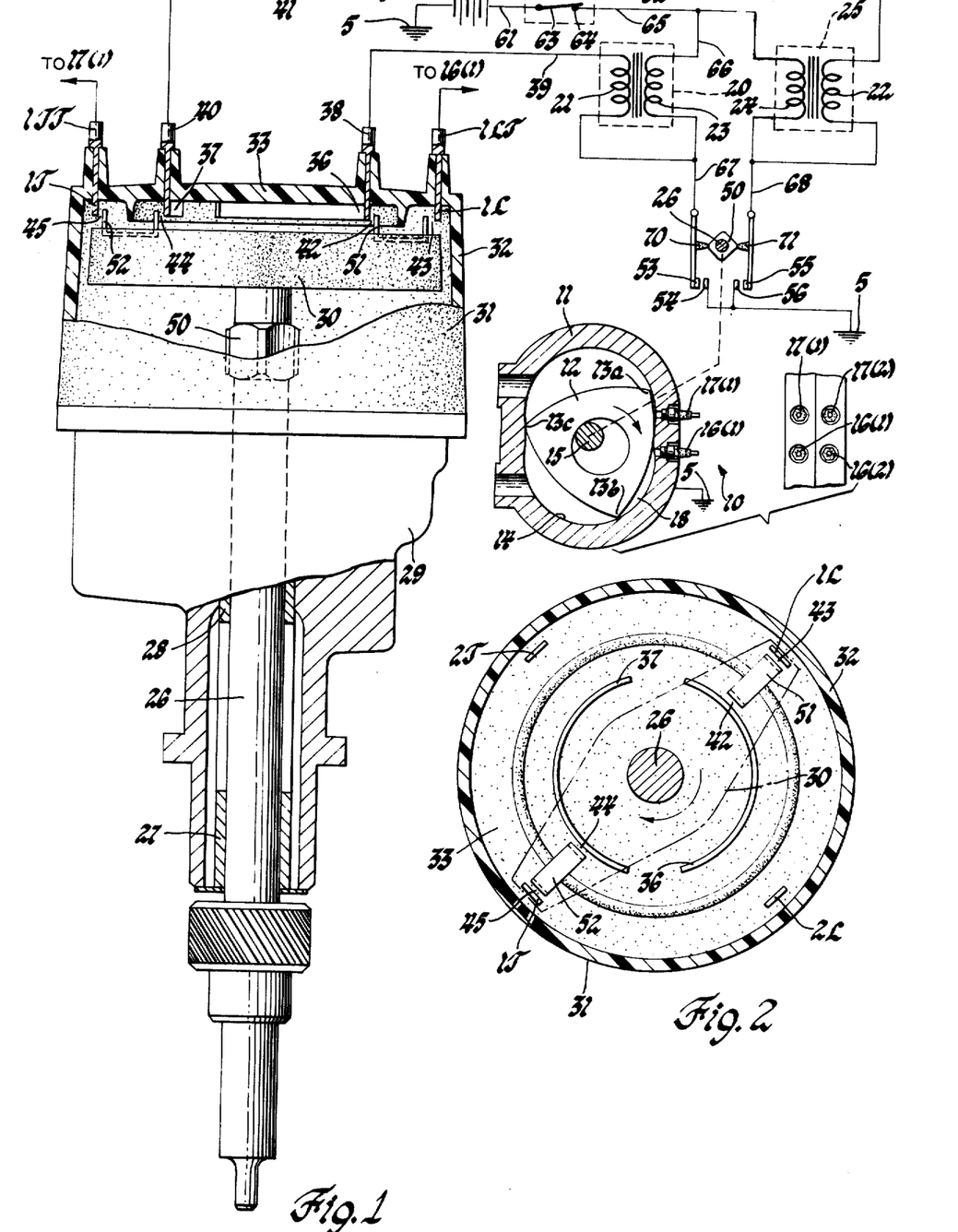
FIG. 1 sets forth, partially in broken cross-section, the ignition distributor for rotary internal combustion engines of this invention in combination with a typical rotary engine ignition system.
FIG. 2 is a view of the distributor cap of the ignition distributor of FIG. 1 as viewed from the open end.

As point of reference or ground potential is the same point electrically throughout the system, it has been illustrated in FIG. 1 by the accepted schematic symbol and referenced by the numeral 5.

Referring to FIG. 1 of the drawings, a two-cylinder rotary internal combustion engine having front and rear cylinders is shown generally at 10 in both a cross-section end view and a partial side view. For purposes of this specification, the front and rear cylinders of engine 10 will be referred to as the Number 1 cylinder and the Number 2 cylinder, respectively. Each cylinder of a rotary internal combustion engine includes a housing 11, a rotary piston or rotor 12 in the form of a curvilinear triangle having three apices 13a, 13b, and 13c and a shaft 15 which is rotatably carried by housing 11 and supports rotor 12. During engine operation, rotor 12 is rotated eccentrically within the epitrochoidal-shaped interior surface 14 of housing 11 in such a manner that the apex edges 13a, 13b and 13c are in sliding contact with interior surface 14 whereby rotor 12 performs its operating steps in such a manner that the volume formed between rotor 12 and housing 11 is constantly changing. A leading spark plug and a trailing spark plug is provided for the combustion chamber of each cylinder of the engine. The leading and trailing spark plugs of each cylinder are mounted in the wall of housing 11 with the arc-gap electrodes thereof in communication with a common combustion chamber 18, the leading spark plug being disposed in leading relationship and the trailing spark plug being disposed in trailing relationship with respect to the direction of rotation of rotor 12, as indicated by the arrow. In FIG. 1, the leading spark plugs for the combustion chambers of the Number 1 and Number 2 cylinders are referenced by the numerals 16(1) and 16(2), respectively, and the trailing spark plugs for the combustion chambers of the Number 1 and Number 2 cylinders are referenced by the numerals 17(1) and 17(2), respectively. Ignition coil 20 is provided for all of the leading spark plugs of the engine and ignition coil 25 is provided for all of the trailing spark plugs of the engine. With single cylinder rotary engines, ignition coil 20 supplies ignition spark potential for the leading spark plug and ignition coil 25 supplies ignition spark potential for the trailing spark plug and with rotary engines having two or more cylinders, ignition coil 20 supplies ignition spark potential for the leading spark plug of each cylinder and ignition coil 25 supplies ignition spark potential for the trailing spark plug of each cylinder.

A distributor shaft member 26, FIG. 1, is journaled for rotation in sleeve-type bearings 27 and 28 within a base member 29 in timed relationship with the associated internal combustion engine 10 in a manner well known in the automotive art. A rotatable member or rotor 30 of an insulating material is arranged to be rotated within a cap member 31, also of an insulating material, in timed relationship with engine 10 through shaft member 26 in a manner well known in the automotive art. Typically, but without intention or inference of a limitation thereto, the distributor cap 31 may be of a "cup-shaped" configuration having a circumferential side wall 32 and a top wall 33.

The ignition distributor of this invention includes a leading spark plug ignition spark energy conductive circuit, a trailing spark plug ignition spark energy input terminal, a leading spark plug output terminal for each leading spark plug and a trailing spark plug output terminal for each trailing spark plug. In FIGS. 1 and 2, the leading spark plug ignition spark energy input terminal is referenced by the numeral 36 and the trailing spark plug ignition spark energy input terminal is referenced by the numeral 37. These ignition spark energy input terminal are of a conductive material such as copper or aluminum. Leading spark plug ignition spark energy input terminal 36 is provided with an input portion 38 through which it may be electrically connected to the secondary winding 21 of leading spark plug ignition coil 20 through lead 39 and trailing spark plug ignition spark energy input terminal 37 is provided with an input portion 40 through which it may be electrically connected to the secondary winding 22 of trailing spark plug ignition coil 25 through lead 41. The leading spark plug output terminal are arranged in a leading spark plug output terminal group of two and referenced, FIG. 2, by the numerals 1L and 2L and the trailing spark plug output terminals are arranged in a trailing spark plug output terminal group of two and are referenced by the numerals 1T and 2T. Without intention or inference of a limitation thereto, the leading and trailing spark plug output circuits may be elongated terminals members of an electrically conductive material such as copper or aluminum arranged to be connected to electrical circuitry external of the ignition distributor and will hereinafter be referred to as the leading and trailing spark plug output terminals. For example, leading spark plug output circuit terminal 1L may be connected to leading spark plug 16(1) through the terminal end 1LT thereof and trailing spark plug output circuit terminal 1T may be connected to trailing spark plug 17(1) through the terminal end 1TT thereof. Leading spark plug energy input terminal 36 is spaced from each corresponding leading spark plug output terminal 1L and 2L and trailing spark plug ignition spark energy input terminal 37 is spaced from each corresponding trailing spark plug output terminal 1T and 2T, as is clearly shown in FIGS. 1 and 2.

Figure 3:
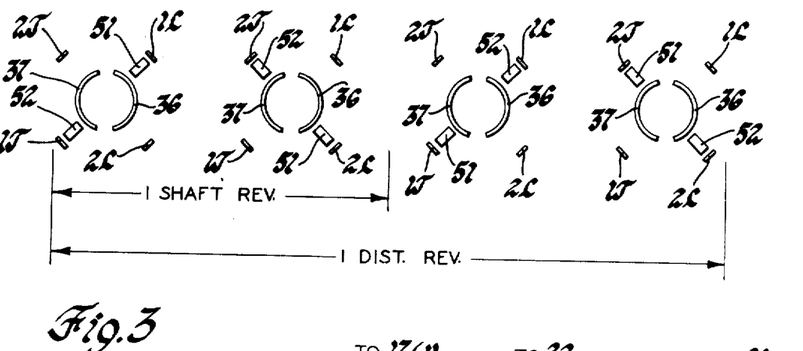
FIG. 3 is a sequence diagram useful in understanding the operation of the ignition distributor of FIGS. 1 and 2.

Two electrically conductive members 51 and 52, which may be of an electrically conductive material such as copper or aluminum, are mounted upon and rotated by rotatable member 30 in arc-gap relationship with each of ignition spark energy conductive input terminal 36 and 37 and each of the leading and trailing spark plug output terminals and are so located upon rotatable member 30 that while either is in arc-gap relationship with one of the ignition spark energy input terminals, the other is in arc-gap relationship with the other ignition spark energy input terminal. With rotor member 30 in the position shown by dashed lines in FIG. 2, conductive member 51 is in arc-gap relationship with leading spark plug ignition spark energy input terminal 36 and corresponding leading spark plug output terminal 1L through respective arc-gaps 42 and 43 and conductive member 52 is in arc-gap relationship with trailing spark plug ignition spark energy input terminal 37 and corresponding trailing spark plug output terminal 1T through respective arc-gaps 44 and 45. As rotor member 30 is rotated by engine 10, through shaft 26, in a clockwise direction, best illustrated in FIG. 3, in 90 mechanical degrees, conductive member 51 will be in arc-gap relationship with leading spark plug ignition spark energy input terminal 36 and corresponding leading spark plug output terminal 2L and conductive member 52 will be in arc-gap relationship with trailing spark plug ignition spark energy input terminal 37 and corresponding trailing spark plug output terminal 2T, in 180 mechanical degrees, conductive member 51 will be in arc-gap relationship with trailing spark plug ignition spark energy input terminal 37 and corresponding trailing spark plug output terminal 1T and conductive member 52 will be in arc-gap relationship with leading spark plug ignition spark energy input terminal 36 and corresponding leading spark plug output terminal 1L, in 270 mechanical degrees, conductive member 51 will be in arc-gap relationship with trailing spark plug ignition spark energy input terminal 37 and corresponding trailing spark plug output terminal 2T and conductive member 52 will be in arc-gap relationship with leading spark plug ignition spark energy input terminal 36 and corresponding leading spark plug output terminal 2L and in 360 mechanical degrees, the conductive members 51 and 52 will be in the position shown in FIG. 2. From this description it is apparent that, while either conductive member 51 or 52 is in arc-gap relationship with one of the ignition spark energy input terminal 36 or 37, the other is in arc-gap relationship with the other ignition spark energy input terminal.

As is well known in the automotive art, to produce the required ignition spark energy, it is necessary that provision be made for the timely interruption of the ignition coil primary winding energizing circuit and that upon the interruption of this energizing circuit, an ignition spark potential is induced in the secondary winding of the same ignition coil. Consequently, respective circuit interrupting devices which interrupt the ignition coil primary winding energizing circuit of each ignition coil 20 and ignition coil 25 in timed relationship with the associated internal combustion engine are required. For purposes of this specification and without intention or inference of a limitation thereto, these respective circuit interrupting devices have been illustrated as conventional ignition breaker contact pairs 53 and 54 and 55 and 56. Movable breaker contact 53 and corresponding stationary breaker contact 54 are connected in series in the energizing circuit of primary winding 23 of leading spark plug ignition coil 20, which may be traced from the positive polarity terminal of battery 8, through lead 61, movable contact 63 and stationary contact 64 of switch 62, leads 65 and 66, primary winding 23, lead 67, movable breaker contact 53, stationary breaker contact 54 and point of reference or ground potential 5 to the negative polarity terminal of battery 8. Movable breaker contact 55 and corresponding stationary breaker contact 56 are connected in series in the energizing circuit of primary winding 24 of trailing spark plug ignition coil 25, which may be traced from the positive polarity terminal of battery 8, through lead 61, the contacts of switch 62, lead 65, primary winding 24, lead 68, movable breaker contact 55, stationary breaker contact 56 and point of reference or ground potential 5 to the negative polarity terminal of battery 8. Switch 62 may be two normally open contacts of a conventional automotive type ignition switch. Cam followers 70 and 71, mounted upon the movable arms of respective movable breaker contacts 53 and 55, are arranged to be in rubbing contact with a cam member 50 having four (4) equally spaced lobes and rotated by shaft 26 in timed relationship with the associated internal combustion engine 10. Consequently, with every 90 degrees of rotation of cam member 50, ignition distributor breaker contact pairs 53 and 54 and 55 and 56 are simultaneously operated to the electrical circuit open condition to interrupt the energizing circuit for respective ignition coil primary windings 23 and 24. Upon each interruption of these energizing circuits, an ignition spark potential is induced in respective secondary windings 21 and 22 in a manner well known in the automotive art. Secondary winding 21 of leading spark plug ignition coil 20 is connected to the leading spark plug ignition spark energy input terminal 36 through lead 39 and input protion 38 and ignition coil secondary winding 22 of trailing spark plug ignition coil 25 is connected to the trailing spark plug ignition spark energy input terminal 37 through lead 41 and input portion 40. Cam member 50 and cam followers 70 and 71 are so arranged relative to each other that, when the conductive members 51 and 52, mounted upon and rotated by rotor member 30, are in arc-gap relationship with a respective one of the spark plug output terminals, the ignition distributor breaker contact pairs 53 and 54 and 55 and 56 are operated to the electrical circuit open condition and an ignition spark potential is induced in each of the ignition coil secondary windings 21 and 22.

In the embodiment of FIGS. 1 and 2, ignition distributor breaker contact pairs 53 and 54 and 55 and 56 are operated to the electrical circuit open condition each 90° of rotation of distributor shaft 26. Beginning with rotor 30 in the position shown by dashed lines in FIG. 2, the ignition spark potential induced in secondary winding 21 of the leading spark plug ignition coil 20 is directed to leading spark plug 16(1) of the front engine cylinder through lead 39, terminal 38, leading spark plug ignition spark energy input terminal 36, arc-gap 42, conductive member 51, arc-gap 43, output terminal 1L for leading spark plug 16(1) and the interconnecting spark lead, not shown, and the ignition spark potential induced in secondary winding 22 of the trailing spark plug ignition coil 25 is simultaneously directed to the trailing spark plug 17(1) of the Number 1 engine cylinder through lead 41, terminal 40, trailing spark plug ignition spark energy input terminal 37, arc-gap 44, conductive member 52, arc-gap 45, output terminal 1T for trailing spark plug 17(1) and the interconnecting spark plug lead, not shown. After 90 degrees of rotation of distributor shaft 26, the ignition spark potential induced in each of secondary windings 21 and 22 is simultaneously directed, respectively, to leading spark plug 16(2) of the Number 2 engine cylinder through lead 39, terminal 38, leading spark plug ignition spark energy input terminal 36, the arc-gap between this ignition spark energy input terminal and conductive member 51, conductive member 51, the arc-gap between conductive member 51 and output terminal 2L for leading spark plug 16(2), output terminal 2L and the interconnecting spark plug lead, not shown, and to trailing spark plug 17(2) of the Number 2 engine cylinder through lead 41, terminal 40, trailing spark plug ignition spark energy conductive circuit 37, the arc-gap between this ignition spark energy input terminal and conductive member 52, conductive member 52, the arc-gap between conductive member 52 and output terminal 2T for trailing spark plug 17(2), output terminal 2T and the interconnecting spark plug lead, not shown. After 180 degrees of rotation of distributor shaft 26, the ignition spark potential induced in each of secondary windings 21 and 22 is simultaneously directed, respectively, to leading spark plug 16(1) of the Number 1 engine cylinder through lead 39, terminal 38, leading spark plug ignition spark energy conductive circuit 36, the arc-gap between this ignition spark energy input terminal and conductive member 52, conductive member 52, the arc-gap between conductive member 52 and output terminal 1L for leading spark plug 16(1), output terminal 2L and the interconnecting spark plug lead, not shown, and to trailing spark plug 17(1) of the Number 1 engine cylinder through lead 41, terminal 40, trailing spark plug ignition spark energy input terminal 37, the arc-gap between this ignition spark energy input terminal and conductive member 51, conductive member 51, the arc-gap between conductive member 51 and output terminal 1T for trailing spark plug 17(1), output terminal 2T and the interconnecting spark plug lead, not shown. After 270 degrees of rotation of distributor shaft 26, the ignition spark potential induced in each of secondary windings 21 and 22 is simultaneously directed, respectively, to leading spark plug 16(2) of the Number 2 engine cylinder through lead 39, terminal 38, leading spark plug ignition spark energy input terminal 36, the arc-gap between this ignition spark energy input terminal and conductive member 52, conductive member 52, the arc-gap between conductive member 52 and output terminal 2L for leading spark plug 16(2), output terminal 2L and the interconnecting spark plug lead, not shown, and to trailing spark plug 17(2) of the Number 2 engine cylinder through lead 41, terminal 40, trailing spark plug ignition spark energy input terminal 37, the arc-gap between this ignition spark energy input terminal and conductive member 51, conductive member 51, the arc-gap between conductive member 51 and output terminal 2T for trailing spark plug 17(2), output terminal 2T and the interconnecting spark plug lead, not shown. After 360 degrees of rotation of distributor shaft 26, rotor 30 is returned to the position shown by dashed lines in FIG. 2. As is clearly shown in the sequence diagram of FIG. 3, the ignition distributor of this invention simultaneously directs the ignition spark energy produced by respective ignition coils to the leading and trailing spark plugs for the same combustion chamber of the engine in succession.

Figures 4, 5:
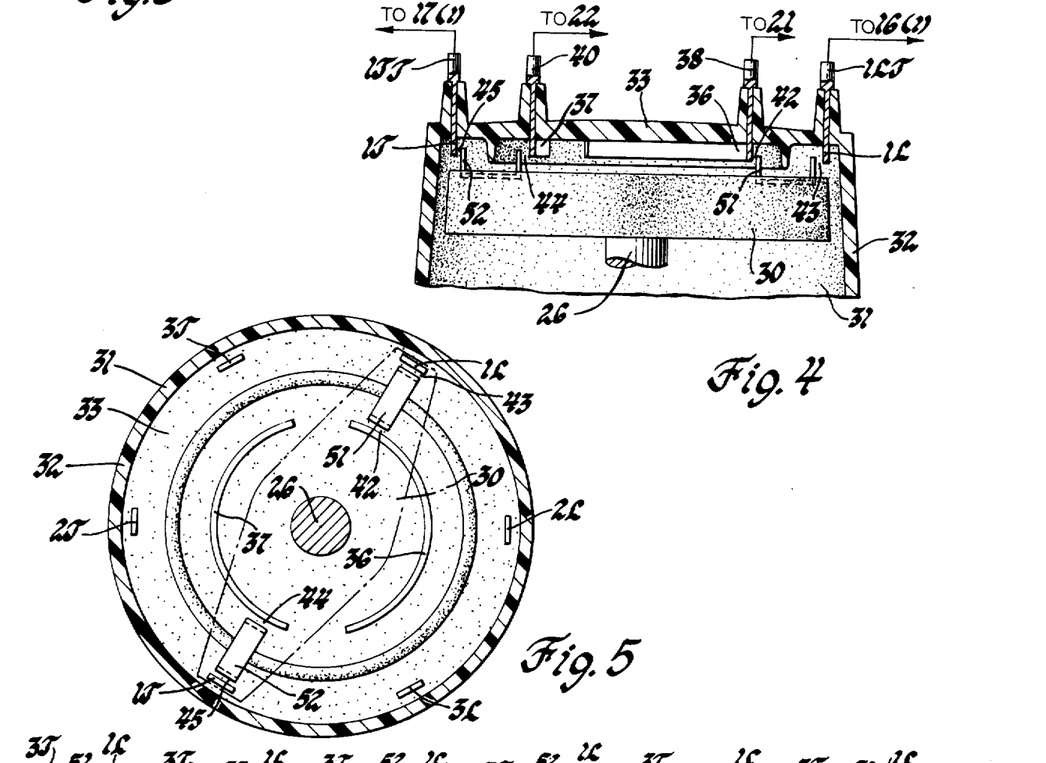
FIG. 4 is a partial broken section view of an ignition distributor cap for the ignition distributor of this invention for use with three-cylinder rotary engines.
FIG. 5 is a view of the distributor cap of FIG. 4 as viewed from the open end.
Figure 6:
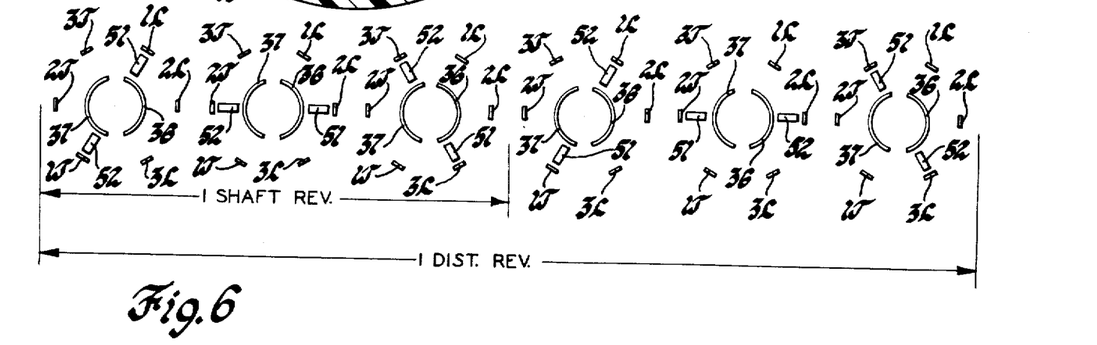
FIG. 6 is a sequence diagram useful in understanding the operation of the ignition distributor of FIGS. 4 and 5.

FIG. 4 is a partial broken section view of an ignition distributor cap for the ignition distributor of this invention for use with three-cylinder rotary engines, FIG. 5 is a view of the distributor cap of FIG. 4 as viewed from the open end thereof and FIG. 6 is a sequence diagram for a three-cylinder rotary engine. With this application, distributor cam 50 has six (6) equally spaced lobes to operate distributor breaker contact pairs 53 and 54 and 55 and 56 to the electrical circuit open condition each 60 degrees of rotation of distributor shaft 26, there are three leading spark plug output terminals 1L, 2L and 3L arranged in an arcuate group of three and corresponding, respectively, to the leading spark plug for the combustion chamber of the Number 1, Number 2 and Number 3 cylinders of the engine and three trailing spark plug output terminals 1T, 2T and 3T arranged in an arcuate group of three and corresponding, respectively, to the trailing spark plug for the combustion chamber of the Number 1, Number 2 and Number 3 cylinders of the engine. The leading spark plug ignition spark energy input terminal 36 is connected to the secondary winding 21 of the leading spark plug ignition coil 20 and the trailing spark plug ignition spark energy input terminal 37 is connected to the secondary winding 22 of the trailing spark plug ignition coil 25 in the same manner as illustrated in FIG. 1. As best illustrated in FIG. 5, the leading spark plug ignition spark energy input terminal 36 is spaced from each corresponding leading spark plug output terminal 1L, 2L and 3L, and the trailing spark plug ignition spark energy conductive circuit 37 is spaced from each corresponding trailing spark plug output terminal 1T, 2T and 3T. As with the two-cylinder engine, electrically conductive members 51 and 52 are rotated by rotor member 30, illustrated by dashed lines in FIG. 5, in arc-gap relationship with each of the ignition spark energy input terminals 36 and 37 and each of the spark plug output terminals and are so located upon rotatable member 30 that while either is in arc-gap relationship with one of the ignition spark energy input terminals 36 or 37, the other is in arc-gap relationship with the other ignition spark energy input terminal. With rotor member 30 in the position shown by dashed lines in FIG. 5, conductive member 51 is in arc-gap relationship with leading spark plug ignition spark energy conductive circuit 36 and corresponding leading spark plug output terminal 1L through respective arc-gaps 42 and 43 and conductive member 52 is in arc-gap relationship with trailing spark plug ignition spark energy input terminal 37 and corresponding trailing spark plug output terminal 1T through respective arc-gaps 44 and 45. As rotor member 30 is rotated by engine 10, through shaft 26, in a clockwise direction, best illustrated in FIG. 6, in 60 mechanical degrees, conductive member 51 will be in arc-gap relationship with leading spark plug ignition spark energy input terminal 36 and corresponding leading spark plug output terminal 2L and conductive member 52 will be in arc-gap relationship with trailing spark plug ignition spark energy input terminal 37 and corresponding trailing spark plug output terminal 2T, in 120 mechanical degrees, conductive member 51 will be in arc-gap relationship with leading spark plug ignition spark energy input terminal 36 and corresponding leading spark plug output terminal 3L and conductive member 52 will be in arc-gap relationship with trailing spark plug ignition spark energy input terminal 37 and corresponding trailing spark plug output terminal 3T, in 180 mechanical degrees, conductive member 51 will be in arc-gap relationship with trailing spark plug ignition spark energy input terminal 37 and corresponding trailing spark plug output terminal 1T and conductive member 52 will be in arc-gap relationship with leading spark plug ignition spark energy input terminal 36 and corresponding leading spark plug output terminal 1L, in 240 mechanical degrees, conductive member 51 will be in are-gap relationship with trailing spark plug ignition spark energy input terminal 37 and corresponding trailing spark plug output terminal 2T and conductive member 52 will be in arc-gap relationship with leading spark plug ignition spark energy input terminal 36 and corresponding leading spark plug output terminal 2L, in 300 mechanical degrees, conductive member 51 will be in arc-gap relationship with trailing spark plug ignition spark energy input terminal 37 and corresponding trailing spark plug output terminal 3T and conductive member 52 will be in arc-gap relationship with leading spark plug ignition spark energy input terminal 36 and corresponding leading spark plug output terminal 3L and in 360 mechanical degrees, the conductive members 51 and 52 will be in the position shown in FIG. 5. From this description, it is apparent that, while either conductive member 51 or 52 is in arc-gap relationship with one of the ignition spark energy input terminal 36 or 37, the other electrically conductive member is in arc-gap relationship with the other ignition spark energy input terminal.

In the embodiment of FIGS. 4 and 5, ignition distributor breaker contact pairs 53 and 54 and 55 and 56 are operated to the electrical circuit open condition each 60 degrees of rotation of distributor shaft 26. Beginning with rotor 30 in the position shown by dashed lines in FIG. 5, the ignition potential induced in each of secondary windings 21 and 22 is simultaneously directed, respectively, to leading spark plug 16(1) and to trailing spark plug 17(1) of the Number 1 engine cylinder through respective circuits previously described. After 60 degrees of rotation of distributor shaft 26, the ignition spark potential induced in each of secondary windings 21 and 22 is simultaneously directed, respectively, to leading spark plug 16(2) and to trailing spark plug 17(2) of the Number 2 engine cylinder through circuits previously described. After 120 degrees of rotation of distributor shaft 26, the ignition spark potential induced in each of secondary windings 21 and 22 is simultaneously directed, respectively, to the leading spark plug of the Number 3 engine cylinder through lead 39, terminal 38, leading spark plug ignition spark energy input terminal 36, the arc-gap between this ignition spark energy input terminal and conductive member 51, conductive member 51, the arc-gap between conductive member 51 and the output terminal 3L for leading spark plug of the Number 3 engine cylinder, output terminal 3L and the interconnecting spark plug lead, not shown, and to the trailing spark plug of the Number 3 engine cylinder through lead 41, terminal 30, trailing spark plug ignition spark energy input terminal 37, the arc-gap between this ignition spark energy input terminal and conductive member 52, conductive member 52, the arc-gap between conductive member 52 and the output terminal 3T for the trailing spark plug of the Number 3 engine cylinder, output terminal 3T and the interconnecting spark plug lead, not shown. After 180 degrees of rotation of distributor shaft 26, the ignition spark potential induced in each of secondary windings 21 and 22 is simultaneously directed, respectively, to leading spark plug 16(1) and to trailing spark plug 17(1) of the Number 1 engine cylinder through circuitry previously described. After 240 degrees of rotation of distributor shaft 26, the ignition spark potential induced in each of secondary windings 21 and 22 is simultaneously directed, respectively to leading spark plug 16(2) and to trailing spark plug 17(2) of the Number 2 engine cylinder through circuitry previously described. After 300 degrees of rotation of distributor shaft 26, the ignition spark potential induced in each of secondary windings 21 and 22 is simultaneously directed, respectively, to the leading spark plug of the Number 3 engine cylinder through lead 39, terminal 38, leading spark plug ignition spark energy input terminal 36, the arc-gap between this ignition spark energy input terminal and conductive member 52, conductive member 52, the arc-gap between conductive member 52 and the output terminal 3L for the leading spark plug of the Number 3 engine cylinder, output terminal 3L and the interconnecting spark plug lead, not shown, and to the trailing spark plug of the Number 3 engine cylinder through lead 41, terminal 40, trailing spark plug ignition spark energy input terminal 37, the arc-gap between this ignition spark energy input terminal and conductive member 51, conductive member 51, the arc-gap between conductive member 51 and output terminal 3T for the trailing spark plug of the Number 3 engine cylinder, output terminal 3T and the interconnecting spark plug lead, not shown. After 360 degrees of rotation of distributor shaft 26, rotor 30 is returned to the position shown by dashed lines in FIG. 5. As is clearly shown in the sequence diagram of FIG. 6, the ignition distributor of this invention simultaneously directs the ignition spark energy produced by respective ignition coils to the leading and trailing spark plugs for the same combustion chamber of the engine in succession.

Figure 7:
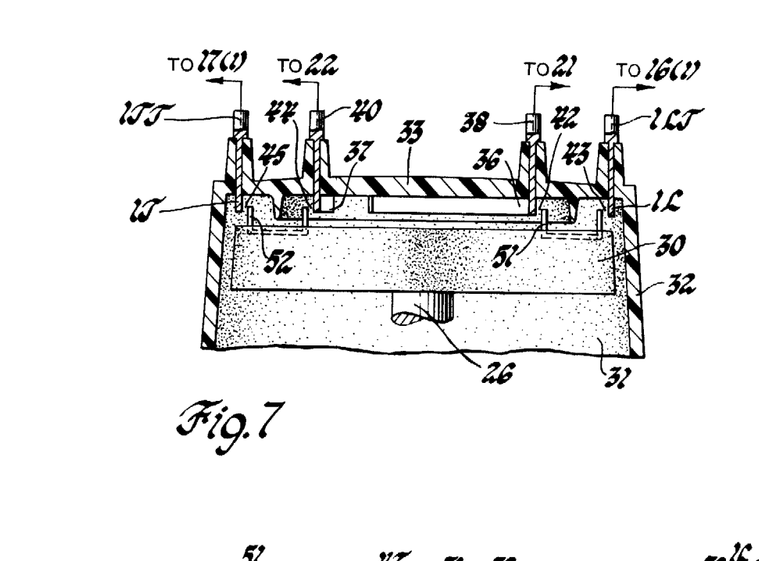
FIG. 7 is a partial broken section view of an ignition distributor cap for the ignition distributor of this invention for use with four-cylinder rotary engines.
Figure 8:
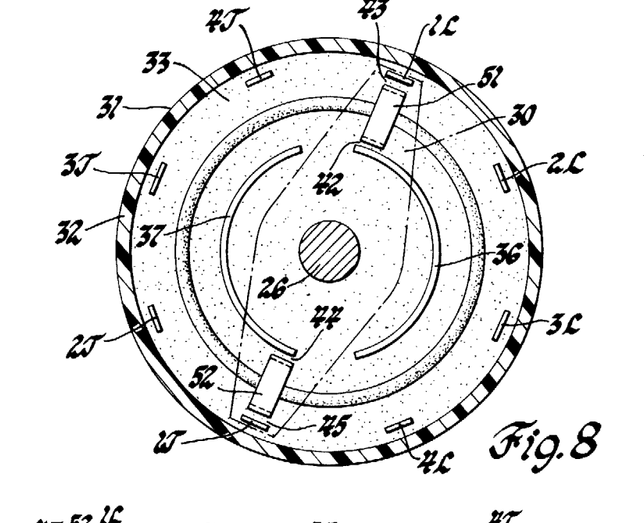
FIG. 8 is a view of the distributor cap of FIG. 7 as viewed from the open end.
Figure 9:
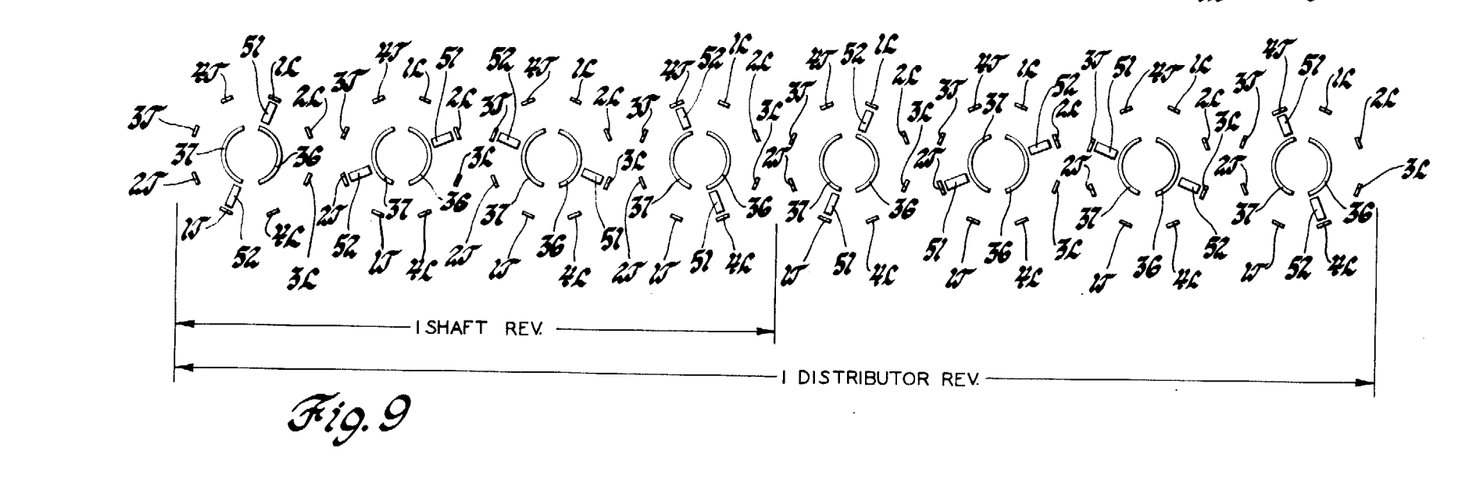
FIG. 9 is a sequence diagram useful in understanding the operation of the ignition distributor of FIGS. 7 and 8.

FIG. 7 is a partial broken section view of an ignition distributor gap for the ignition distributor of this invention for use with four-cylinder rotary engines, FIG. 8 is a view of the distributor cap of FIG. 7 as viewed from the open end thereof and FIG. 9 is a sequence diagram for a four-cylinder rotary engine. With this application, distributor cam 50 has eight (8) equally spaced lobes to operate distributor breaker contact pairs 53 and 54 and 55 and 56 to the electrical circuit open condition each 45 degrees of rotation of distributor shaft 26, there are four leading spark plug output terminals 1L, 2L, 3L and 4L arranged in an arcuate group of four and corresponding, respectively, to the leading spark plug for the combustion chamber of the Number 1, Number 2, 2, Number 3 and Number 4 cylinders of the engine and four trailing spark plug output terminals 1T, 2T, 3T and 4T arranged in an arcuate group of four and corresponding, respectively, to the trailing spark plug for the combustion chamber of the Number 1, Number 2, Number 3 and Number 4 cylinders of the engine. The leading spark plug ignition spark energy input terminal 36 is connected to the secondary winding 21 of the leading spark plug ignition coil 20 and the trailing spark plug ignition spark energy input terminal 37 is connected to the secondary winding 22 of the trailing spark plug ignition coil 25 in the same manner as illustrated in FIG. 1. As best illustrated in FIG. 8, the leading spark plug ignition spark energy conductive circuit 36 is spaced from each corresponding leading spark plug output circuit, terminal 1L, 2L, 3L and 4L, and the trailing spark plug ignition spark energy input terminal 37 is spaced from each corresponding trailing spark plug output terminal 1T, 2T, 3T and 4T. As with the two and three-cylinder engines, electrically conductive members 51 and 52 are rotated by rotor member 30, illustrated by dashed lines in FIG. 8, in arc-gap relationship with each of the ignition spark energy input terminals 36 and 37 and each of the spark plug output circuits and are so located upon rotatable member 30 that while either is in arc-gap relationship with one of the ignition spark energy input terminals 36 or 37, the other is in arc-gap relationship with the other ignition spark energy input terminal. With rotor member 30 in the position shown by dashed lines in FIG. 8, conductive member 51 is in arc-gap relationship with leading spark plug ignition spark energy input terminal 36 and corresponding leading spark plug output terminal 1L through respective arc-gaps 42 and 43 and conductive member 52 is in arc-gap relationship with trailing spark plug ignition spark energy input terminal 37 and corresponding trailing spark plug output terminal 1T through respective arc-gaps 44 and 45. As rotor member 30 is rotated by engine 10, through shaft 26, in a clockwise direction, best illustrated in FIG. 9, in 45 mechanical degrees, conductive member 51 will be in arc-gap relationship with leading spark plug ignition spark energy input terminal 36 and corresponding leading spark plug output terminal 2L and conductive member 52 will be in arc-gap relationship with trailing spark plug ignition spark energy input terminal 37 and corresponding trailing spark plug output terminal 2T, in 90 mechanical degrees, conductive member 51 will be in arc-gap relationship with leading spark plug ignition spark energy input terminal 36 and corresponding leading spark plug output terminal 3L and conductive member 52 will be in arc-gap relationship with trailing spark plug ignition spark energy input terminal 37 and corresponding trailing spark plug output terminal 3T, in 135 mechanical degrees, conductive member 51 will be in arc-gap relationship with leading spark plug ignition spark energy input terminal 36 and corresponding leading spark plug output terminal 4L and conductive member 52 will be in arc-gap relationship with trailing spark plug ignition spark energy input terminal 37 and corresponding trailing spark plug output terminal 4T, in 180 mechanical degrees, conductive member 51 will be in arc-gap relationship with trailing spark plug ignition spark energy input terminal 37 and corresponding trailing spark plug output terminal 1T and conductive member 52 will be in arc-gap relationship with leading spark plug ignition spark energy input terminal 36 and corresponding leading spark plug output terminal 1L, in 225 mechanical degrees, conductive member 51 will be in arc-gap relationship with trailing spark plug ignition spark energy input terminal 37 and corresponding trailing spark plug output terminal 2T and conductive member 52 will be in arc-gap relationship with leading spark plug ignition spark energy input terminal 36 and corresponding leading spark plug output terminal 2L, in 270 mechanical degrees, conductive member 51 will be in arc-gap relationship with trailing spark plug ignition spark energy input terminal 37 and corresponding trailing spark plug output terminal 3T and conductive member 52 will be in arc-gap relationship with leading spark plug ignition spark energy input terminal 36 and corresponding leading spark plug output terminal 3L, in 315 mechanical degrees, conductive member 51 will be in arc-gap relationship with trailing spark plug ignition spark energy input terminal 37 and corresponding trailing spark plug output terminal 4T and conductive member 52 will be in arc-gap relationship with leading spark plug ignition spark energy input terminal 36 and corresponding leading spark plug output terminal 4L, and in 360 mechanical degrees, the conductive members 51 and 52 will be in the position shown in FIG. 8. From this description it is apparent that, while either conductive member 51 or 52 is in arc-gap relationship with one of the ignition spark energy input terminals 36 or 37, the other electrically conductive member is in arc-gap relationship with the other ignition spark energy input terminal.

In the embodiment of FIGS. 4 and 5, ignition distributor breaker contact pairs 53 and 54 and 55 and 56 are operated to the electrical circuit open condition each 45 degrees of rotation of distributor shaft 26. Beginning with rotor 30 in the position shown by dashed lines in FIG. 5, the ignition potential induced in each of secondary windings 21 and 22 is simultaneously directed, respectively, to leading spark plug 16(1) and to trailing spark plug 17(1) of the Number 1 engine cylinder through respective circuits previously described. After 45 degrees of rotation of distributor shaft 26, the ignition potential induced in each of secondary windings 21 and 22 is simultaneously directed, respectively, to leading spark plug 16(2) and to trailing spark plug 17(2) of the Number 2 engine cylinder through respective circuits previously described. After 90 degrees of rotation of distributor shaft 26, the ignition potential induced in each of secondary windings 21 and 22 is simultaneously directed, respectively, to the leading and trailing spark plug of the Number 3 engine cylinder through respective circuits previously described. After 135 degrees of rotation of distributor shaft 26, the ignition spark potential induced in each of secondary windings 21 and 22 is simultaneously directed, respectively, to the leading spark plug of the Number 4 engine cylinder through lead 39, terminal 38, leading spark plug ignition spark energy input terminal 36, the arc-gap between this ignition spark energy input terminal and conductive member 51, conductive member 51, the arc-gap between conductive member 51 and output terminal 4L for the leading spark plug of the Number 4 engine cylinder, output terminal 4L and the interconnecting spark plug lead, not shown, and to the trailing spark plug of the Number 4 engine cylinder through lead 41, terminal 40, trailing spark plug ignition spark energy input terminal 37, the arc-gap between this ignition spark energy input terminal and conductive member 52, conductive member 52, the arc-gap between conductive member 52 and the output terminal 4T for the trailing spark plug of the Number 4 engine cylinder, output terminal 4T and interconnecting spark plug lead, not shown. After 180° of rotation of distributor shaft 26, the ignition spark potential induced in each of secondary windings 21 and 22 is simultaneously directed, respectively, to leading spark plug 16(1) and to trailing spark plug 17(1) of the Number 1 engine cylinder through circuitry previously described. After 225° of rotation of distributor shaft 26, the ignition spark potential induced in each of secondary windings 21 and 22 is simultaneously directed, respectively, to leading spark plug 16(2) and to trailing spark plug 17(2) of the Number 2 engine cylinder through circuitry previously described. After 270 degrees of rotation of distributor shaft 26, the ignition spark potential induced in each of secondary windings 21 and 22 is simultaneously directed, respectively, to the leading and trailing spark plugs of the Number 3 engine cylinder through circuitry previously described. After 315 degrees of rotation of distributor shaft 26, the ignition spark potential induced in each of secondary windings 21 and 22 is simultaneously directed, respectively, to the leading spark plug of the Number 4 engine cylinder through lead 39, terminal 38, leading spark plug ignition spark energy input terminal 36, the arc-gap between this ignition spark energy input terminal and conductive member 52, conductive member 52, the arc-gap between conductive member 52 and output terminal 4L for the leading spark plug of the Number 4 engine cylinder, output terminal 4L and the interconnecting spark plug lead, not shown, and to the trailing spark plug of the Number 4 engine cylinder through lead 41, terminal 40, trailing spark plug ignition spark energy input terminal 37, the arcgap between this ignition spark energy input terminal and conductive member 51, conductive member 51, the arc-gap between conductive member 51 and the output terminal 4T for the trailing spark plug of the Number 4 engine cylinder, output terminal 4T and the interconnecting trailing spark plug lead, not shown. After 360 degrees of rotation of distributor shaft 26, rotor 30 is returned to the position shown by dashed lines in FIG. 5. As is clearly shown in the sequence diagram of FIG. 3, the ignition distributor of this invention simultaneously directs the ignition spark energy produced by respective ignition coils to the leading and trailing spark plugs for the same combustion chamber of the engine in succession.

In the preferred embodiment of the ignition distributor of this invention as set forth in the drawings, the leading and trailing spark plug ignition spark energy conductive circuits 36 and 37, respectively, are shown to be of an arcuate configuration concentric with and spaced from each corresponding arcuate leading and trailing spark plug output terminal group and the electrically conductive members 51 and 52, mounted upon and rotated by rotor member 30, are shown to be of a U configuration and rotated in the spaces between the ignition spark energy input terminal and the respective corresponding spark plug output terminals and in arcgap relationship with each of the ignition spark energy input terminal and each of the spark plug output terminals. It is to be specifically understood that other arrangements may be employed without departing from the spirit of the invention so long as the electrically conductive members mounted upon and rotated by rotatable member 30 are rotated in arc-gap relationship with each of the ignition spark energy input terminal and each of the spark plug output terminals and so located upon rotatable member 30 that while either is in arc-gap relationship with one of the ignition spark energy input terminal, the other is in arc-gap relationship with the other ignition spark energy input terminal.

While three (3) preferred embodiments of the ignition distributor for rotary internal combustion engines of this invention have been shown and described, it will be obvious to those skilled in the art that various modifications and substitutions may be made without departing from the spirit of the invention which is to be limited only within the scope of the appended claims.

What is claimed is:

1. An ignition distributor including a rotatable shaft for simultaneously directing ignition spark energy to the leading and trailing spark plugs for the same combustion chamber of an internal combustion rotary engine having a leading and a trailing spark plug for each combustion chamber comprising: a leading spark plug output terminal for each leading spark plug; a trailing spark plug output terminal for each trailing spark plug; means for supporting said leading and trailing spark plug output terminals; a leading spark plug ignition spark energy input terminal supported in spaced relationship with each corresponding said leading spark plug output terminal; a trailing spark plug ignition spark energy input terminal supported in spaced relationship with each corresponding said trailing spark plug output terminal; a rotatable member of insulating material mounted upon and rotated by said rotatable shaft; and two electrically conductive members mounted upon and rotated by said rotatable member in arc-gap relationship with each of said ignition spark energy input terminals and each of said outut terminals and so located upon said rotatable member that while either is in arc-gap relationship with one of said ignition spark energy input terminals, the other is in arc-gap relationship with the other said ignition spark energy input terminal.

2. An ignition distributor including a rotatable shaft for simultaneously directing ignition spark energy to the leading and trailing spark plugs for the same combustion chamber of an internal combustion rotary engine having a leading and a trailing spark plug for each combustion chamber comprising: a leading spark plug output terminal for each leading spark plug; a trailing spark plug output terminal for each trailing spark plug; means for supporting said leading and trailing spark plug output terminals; a leading spark plug ignition spark energy input terminal supported in spaced relationship with each corresponding said leading spark plug output terminal; a trailing spark plug ignition spark energy input terminal supported in spaced relationship with each corresponding said trailing spark plug output terminal; a rotatable member of insulating material mounted upon and rotated by said rotatable shaft; and two electrically conductive members mounted upon and rotated by said rotatable member within the spaces between said ignition spark energy input terminals and the respective corresponding said output terminals in arc-gap relationship with each of said ignition spark energy input terminals and each of said output terminals and so located upon said rotatable member that while either is in arc-gap relationship with one of said ignition spark energy input terminals, the other is in arc-gap relationship with the other said ignition spark energy input terminal.

3. An ignition distributor including a rotatable shaft for simultaneously directing ignition spark energy to the leading and trailing spark plugs for the same combustion chamber of an internal combustion rotary engine having a leading and a trailing spark plug for each combustion chamber comprising: a distributor cap of an insulating material; a leading spark plug output terminal for each leading spark plug supported by said distributor cap; a trailing spark plug output terminal for each trailing spark plug supported by said distributor cap; a leading spark plug ignition spark energy input terminal supported in spaced relationship with each corresponding said leading spark plug output terminal; a trailing spark plug ignition spark energy input terminal supported in spaced relationship with each corresponding said trailing spark plug output terminal; a rotatable member of insulating material mounted upon and rotated by said rotatable shaft within said distributor cap; and two electrically conductive members mounted upon and rotated by said rotatable member in arc-gap relationship with each of said ignition spark energy input terminals and each of said output terminals and so located upon said rotatable member that while either is in arc-gap relationship with one of said ignition spark energy input terminals, the other is in arc-gap relationship with the other said ignition spark energy input terminal.

4. An ignition distributor including a rotatable shaft for simultaneously directing ignition spark energy to the leading and trailing spark plugs for each combustion chamber in succession of an internal combustion rotary engine having a leading and a trailing spark plug for each combustion chamber comprising: a plurality of leading spark plug output terminals, each corresponding to a respective leading spark plug, arranged in a leading spark plug output terminal group; a plurality of trailing spark plug output terminals, each corresponding to a respective trailing spark plug, arranged in a trailing spark plug output terminal group; means for supporting said leading and trailing spark plug output terminals; a leading spark plug ignition spark energy input terminal supported in spaced relationship with each corresponding said leading spark plug output terminal group; a trailing spark plug ignition spark energy input terminal supported in spaced relationship with each corresponding said trailing spark plug output terminal group; a rotatable member of insulating material mounted upon and rotated by said rotatable shaft; and two electrically conductive members mounted upon and rotated by said rotatable member in arc-gap relationship with each of said ignition spark energy input terminals and each of said output terminals and so located upon said rotatable member that while either is in arc-gap relationship with one of said ignition spark energy input terminals, the other is in arc-gap relationship with the other said ignition spark energy input terminal.

5. An ignition distributor including a rotatable shaft for simultaneously directing ignition spark energy to the leading and trailing spark plugs for each combustion chamber in succession of an internal combustion rotary engine having a leading and a trailing spark plug for each combustion chamber comprising: a plurality of leading spark plug output terminals, each corresponding to a respective leading spark plug, arranged in a leading spark plug output terminal group; a plurality of trailing spark plug output terminals, each corresponding to a respective trailing spark plug, arranged in a trailing spark plug output terminal group; means for supporting said leading and trailing spark plug output terminals; a leading spark plug ignition spark energy input terminal supported in spaced relationship with each corresponding said leading spark plug output terminal group; a trailing spark plug ignition spark energy input terminal supported in spaced relationship with each corresponding said trailing spark plug output terminal group; a rotatable member of insulating material mounted upon and rotated by said rotatable shaft; and two electrically conductive members mounted upon and rotated by said rotatable member within the space between said ignition spark energy input terminals and the respective corresponding said output terminal groups in arc-gap relationship with each of said ignition spark energy input terminals and each of said output terminals and so located upon said rotatable member that while either is in arc-gap relationship with one of said ignition spark energy input terminals, the other is in arc-gap relationship with the other said ignition spark energy input terminal.

6. An ignition distributor including a rotatable shaft for simultaneously directing ignition spark energy to the leading and trailing spark plugs for each combustion chamber in succession of an internal combustion rotary engine having a leading and a trailing spark plug for each combustion chamber comprising: a plurality of leading spark plug output terminals, each corresponding to a respective leading spark plug, arranged in an arcuate leading spark plug output circuit group; a plurality of trailing spark plug output terminals, each corresponding to a respective trailing spark plug, arranged in an arcuate trailing spark plug output terminal group; means for supporting said leading and trailing spark plug output terminals; a leading spark plug ignition spark energy input terminal of an arcuate configuration supported concentric with and spaced from the corresponding said arcuate leading spark plug output terminal group; a trailing spark plug ignition spark energy input terminal of an arcuate configuration supported concentric with and spaced from the corresponding said arcuate trailing spark plug output terminal group; a rotatable member of insulating material mounted upon and rotated by said rotatable shaft; and two electrically conductive members mounted upon and rotated by said rotatable member in arc-gap relationship with each of said ignition spark energy input terminals and each of said output terminals and so located upon said rotatable member that while either is in arc-gap relationship with one of said ignition spark energy input terminals, the other is in arc-gap relationship with the other said ignition spark energy input terminal.

7. An ignition distributor including a rotatable shaft for simultaneously directing ignition spark energy to the leading and trailing spark plugs for each combustion chamber in succession of an internal combustion rotary engine having a leading and a trailing spark plug for each combustion chamber comprising: a plurality of leading spark plug output terminals, each corresponding to a respective leading spark plug, arranged in an arcuate leading spark plug output terminal group; a plurality of trailing spark plug output terminals, each corresponding to a respective trailing spark plug, arranged in an arcuate trailing spark plug output terminal group; means for supporting said leading and trailing spark plug output terminals; a leading spark plug ignition spark energy input terminal of an arcuate configuration supported concentric with and spaced from the corresponding said arcuate leading spark plug output terminal group; a trailing spark plug ignition spark energy input terminal of an arcuate configuration supported concentric with and spaced from the corresponding said trailing spark plug output terminal group; a rotatable member of insulating material mounted upon and rotated by said rotatable shaft; and two electrically conductive members mounted upon and rotated by said rotatable member within the spaces between said ignition spark energy arcuate input terminals and the respective corresponding said arcuate output terminal groups in arc-gap relationship with each of said arcuate ignition spark energy input terminals and each of said output terminals and so located upon said rotatable member that while either is in arc-gap relationship with one of said arcuate ignition spark energy input terminals, the other is in arc-gap relationship with the other said arcuate ignition spark energy input terminal.

* * * * *

UNITED STATES PATENT AND TRADEMARK OFFICE
CERTIFICATE OF CORRECTION

PATENT NO. : 3,894,202
DATED : July 8, 1975
INVENTOR(S) : Robert E. Campbell and Richard D. Watson It is certified that error appears in the above-identified patent and that said Letters Patent are hereby corrected as shown below:

Title page, under ABSTRACT, line 14, "ingnition" should read -- ignition --.
Col. 2, lines 6 and 7, "terminals" should read -- terminal --;
line 10, "terminal" should read -- terminals --;
line 12, "conductive circuit" should read -- input terminal --.
Col. 3, lines 41 and 42, "conductive circuit" should read -- input terminal --;
line 50, "terminal" should read -- terminals --;
line 60, "terminal" should read -- terminals --;
line 67, "circuits" should read -- terminals --;
same line, "terminals" should read -- terminal --.
Col. 4, line 21, after "energy" delete "conductive";
lines 21 and 22, "terminal" should read -- terminals --;
line 65, "terminal" should read -- terminals --.
Col. 5, line 55, "protion" should read -- portion --.
Col. 6, line 35, "conductive circuit" should read -- input terminal --;
line 47, "conductive circuit" should read -- input terminal --.
Col. 7, lines 66 and 67, "conductive circuit" should read -- input terminals --.
Col. 8, line 30, "are-gap" should read -- arc-gap --.
Col. 9, line 13, "30" should read -- 40 --;
line 61, "gap" should read -- cap --.
Col. 10, line 7, delete one occurrence of "2,";
line 20, "conductive circuit" should read -- input terminal --;
line 22, after "output" delete "circuit,".
Col. 11, line 56, "plug" should read -- plugs --.
Col. 12, line 42, "arcgap" should read -- arc-gap --;
line 59, "conductive circuits" should read -- input terminals --.

(Cont.)

UNITED STATES PATENT AND TRADEMARK OFFICE
CERTIFICATE OF CORRECTION

PATENT NO. : 3,894,202 (Page 2)
DATED : July 8, 1975
INVENTOR(S) : Robert E. Campbell and Richard D. Watson It is certified that error appears in the above—identified patent and that said Letters Patent are hereby corrected as shown below:

Col. 13, line 2, "terminal" should read -- terminals --;
line 8, "terminal" should read -- terminals --;
line 11, "terminal" should read -- terminals --.

Signed and Sealed this third Day of February 1976

[SEAL]

Attest:

RUTH C. MASON
Attesting Officer

C. MARSHALL DANN
Commissioner of Patents and Trademarks